(12) United States Patent
Jackson

(10) Patent No.: US 12,132,442 B1
(45) Date of Patent: Oct. 29, 2024

(54) REFLECTING DEVICE FOR SOLAR PANELS

(71) Applicant: Donovan Jackson, Corpus Christi, TX (US)

(72) Inventor: Donovan Jackson, Corpus Christi, TX (US)

( * ) Notice: Subject to any disclaimer, the term of this patent is extended or adjusted under 35 U.S.C. 154(b) by 0 days.

(21) Appl. No.: 18/200,409

(22) Filed: May 22, 2023

(51) Int. Cl.
*H02S 40/22* (2014.01)
*H02S 40/42* (2014.01)

(52) U.S. Cl.
CPC ............ *H02S 40/22* (2014.12); *H02S 40/425* (2014.12)

(58) Field of Classification Search
CPC ............................... H02S 40/22; H02S 40/425
See application file for complete search history.

(56) References Cited

U.S. PATENT DOCUMENTS 5,427,628 A * 6/1995 Hartley ............... H01L 31/0547
136/246

* cited by examiner

*Primary Examiner* — Angelo Trivisonno
(74) *Attorney, Agent, or Firm* — Lyman Moulton, Esq.; Moulton Patents, PLLC

(57) ABSTRACT

The Jackson's Sphere is the only innovation of its kind that optimized the way solar panels collect energy from sunlight, while significantly reducing the time spent on their upkeep and maintenance. This unprecedented device is uniquely designed with durable, high-quality materials to ensure sustainability and complete functionality, in any and all inclement weather situations.

7 Claims, 1 Drawing Sheet

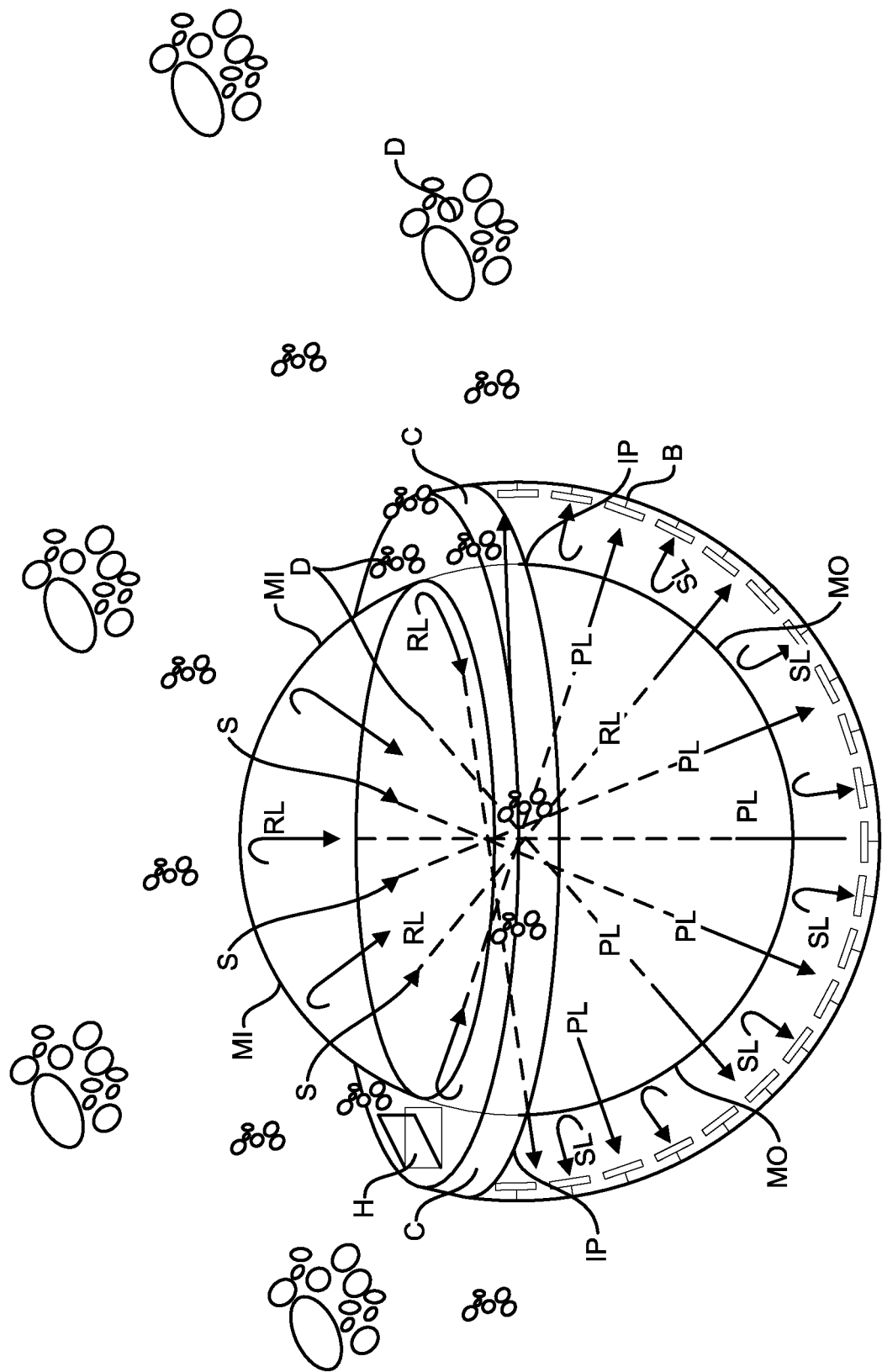

REFLECTING DEVICE FOR SOLAR PANELS

BACKGROUND

The use of solar panels, as an effective alternative green energy option, requires sun's rays to generate electricity, therefore, it's easy to assume that without proper sunlight solar panels will not function adequately. As a result, solar panels in cloudy weather or those only exposed to indirect sunlight are less likely to provide efficient and reliable power, for varying needs and/or purposes. There have been no products available as original equipment or as an aftermarket to address this problem.

An apparatus to aid solar panels ability to generate green energy even on cloudy days, is not being met by any known device or system at present. There have been no products available as original equipment or as an aftermarket to address this problem either.

SUMMARY OF THE INVENTION

The main purpose of the reflecting device for solar panels is to provide users with a unique sphere made from two-way mirrors to capture sunlight from all angles and reflect it to the solar panels, underneath.

A disclosed light reflecting device includes an upper hemispherical two way mirror configured to pass a sunlight through an outer surface and to reflect the passed sunlight back from its inner surface. The disclosure also includes a lower hemispherical two way mirror configured to receive the passed and the reflected sunlight through its inner surface and reflect a stray sunlight back from its outer surface.

BRIEF DESCRIPTION OF THE DRAWINGS

FIG. 1 is a front perspective view of the reflecting device for solar panels, in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1 is a front perspective view of the light reflecting device for solar panels in accordance with an embodiment of the present disclosure. The view shows the upper two-way mirror hemisphere referenced as MI (mirrored inside), the lower two way mirror hemisphere MO (mirror outside), solar panels referenced as B, collar C, access hatch referenced as H, mirror inflection point IP where the mirrored surface transitions from inside to outside, gravel D to keep dust down, sunlight S, reflected sunlight RL, passed sunlight PL and stray sunlight SL. The gravel D comprises a light absorbing rock arranged around the device and on the collar C to absorb extra sunlight. The upper MI and the lower MO hemispherical two way mirrors comprise a transparent glass in some embodiments. The upper and the lower hemispherical two way mirrors also comprise a solid transparent plastic comprising polymethyl methacrylate, also know as Plexiglass® in other embodiments. The disclosure is suspended from the collar C above the earth and stray sunlight is reflected from the plurality of solar panels B themselves. The disclosure is also alternatively suspended in a coolant up to the collar C. The disclosure is also suspended in water and stray sunlight comes from the water. The upper hemispherical two way mirror is parabolic in shape in some embodiments. The disclosure includes multiple devices interconnectedly arranged in a solar farm.

The present disclosed reflecting device for solar panels, also known as "Jackson's Sphere", offers a compact light reflecting medium that makes it easier and cheaper to run a solar farm by removing the need to position the solar panels to face the sun, as well as, reduces the loss in efficiency from dirty panels in utilization. Expanding on the initial concept of sunlight being absorbed by PV cells to create an electrical charge, the Jackson's Sphere introduces a novel mirrored sphere made of two-way mirrors with the mirrored side facing in, so the device can reflect all collected light back into the center, in addition, the sphere is strategically designed with a few seams as possible to minimize the loss of light. To use the Jackson's Sphere, one would simply place the sphere on top of the solar panels that are underground and in a sealed clean environment to ensure their operation is at peak performance all year long. The sphere will then capture sunlight form all angles and reflect it back to the solar panels underneath the sphere. Unlike any other solar panel maintenance, with this avant-garde product, individuals will only have to keep the outside of the sphere clean which can be made easier if the gravel is laid out around the sphere to minimize dust, as opposed to constantly cleaning the solar panels themselves. The Jackson's Sphere eliminates the cost of moving the heavy and/or fixed panels and eliminates the need for individuals to deal with dirty or damaged panels, all of which are major cost factors when managing solar farms.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A light reflecting device comprising:
    an upper hemispherical two way mirror configured to pass a sunlight through an outer surface and to reflect the passed sunlight back from its inner surface; and
    a lower hemispherical two way mirror configured to receive the passed and the reflected sunlight through its inner surface and reflect a stray sunlight back from its outer surface.

2. The light reflecting device of claim 1, wherein both hemispherical two way mirrors together comprise a spherical two way mirror having a mirrored side inflection point there between.

3. The light reflecting device of claim 1, further comprising an access hatch configured to enable access into the hemispherical two way mirrors.

4. The light reflecting device of claim 1, wherein the upper and the lower hemispherical two way mirrors comprise a transparent glass.

5. The light reflecting device of claim 1, wherein the upper and the lower hemispherical two way mirrors comprise a solid transparent plastic comprising polymethyl methacrylate, also know as Plexiglass®.

6. The light reflecting device of claim 1, further comprising a plurality of solar panels spherically arranged outside the lower hemispherical two way mirror to receive the passed, the reflected and the stray sunlight.

7. The light reflecting device of claim 6, further comprising a collar configured to support the upper hemispherical and the lower hemispherical two way mirrors adjacent the solar panels in the spherical arrangement.

* * * * *